(12) United States Patent
Sato

(10) Patent No.: US 10,611,035 B2
(45) Date of Patent: Apr. 7, 2020

(54) APPARATUS FOR SUPPORTING WORKPIECE, METHOD OF SUPPORTING WORKPIECE, AND ROBOT ARM

(71) Applicant: Toyota Jidosha Kabushiki Kaisha, Toyota-shi, Aichi-ken (JP)

(72) Inventor: Shun Sato, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/352,112

(22) Filed: Mar. 13, 2019

(65) Prior Publication Data

US 2019/0283261 A1 Sep. 19, 2019

(30) Foreign Application Priority Data

Mar. 15, 2018 (JP) .................................. 2018-047832

(51) Int. Cl.
*B25J 15/00* (2006.01)
*B29C 35/02* (2006.01)

(52) U.S. Cl.
CPC ....... *B25J 15/0076* (2013.01); *B25J 15/0019* (2013.01); *B29C 35/0288* (2013.01)

(58) Field of Classification Search
CPC .... B25J 15/0019; B25J 15/0076; B25J 13/08; B25J 13/087; B25J 19/0054; B29C 35/0288; Y10S 901/39
USPC ................................................ 294/86.4, 216
See application file for complete search history.

(56) References Cited

U.S. PATENT DOCUMENTS

| 5,407,185 | A | * | 4/1995 | Zehnpfennig | B25B 1/2421 269/266 |
| 6,431,622 | B1 | * | 8/2002 | Depeursinge | B23Q 3/086 294/213 |
| 8,096,034 | B2 | * | 1/2012 | Barvosa-Carter | A44B 18/0003 29/419.1 |
| 8,240,729 | B2 | * | 8/2012 | Vittor | B25J 15/02 294/213 |
| 8,550,519 | B2 | * | 10/2013 | Mankame | B25J 9/1085 294/86.4 |
| 9,067,324 | B2 | * | 6/2015 | Matsuoka | B25J 15/0023 |
| 2008/0272259 | A1 | * | 11/2008 | Zavattieri | B60N 3/105 248/311.2 |

(Continued)

FOREIGN PATENT DOCUMENTS

| JP | 4-300189 | * 10/1992 | .............. B25J 15/08 |
| JP | 2013-136125 A | 7/2013 | |

*Primary Examiner* — Dean J Kramer
(74) *Attorney, Agent, or Firm* — Dinsmore & Shohl LLP

(57) ABSTRACT

An apparatus for supporting a workpiece having high versatility that can address a plurality of types of workpieces is achieved. An apparatus for supporting a workpiece according to one embodiment of the present disclosure includes a resin part configured to support the workpiece, the resin part being softened when it is heated to a predetermined first temperature or higher in an initial shape, cured when it is cooled down to a temperature lower than a predetermined second temperature from the state in which it is softened, and softened while it is restored to the initial shape when it is heated again to the first temperature or higher; a temperature adjustment part configured to adjust the temperature of the resin part; and a controller configured to control the temperature adjustment part.

3 Claims, 13 Drawing Sheets

(56) References Cited

U.S. PATENT DOCUMENTS

| | | | | |
|---|---|---|---|---|
| 2008/0289757 A1* | 11/2008 | Xie | ............................ | C09J 7/00 |
| | | | | 156/311 |
| 2013/0033050 A1* | 2/2013 | Matsuoka | ............ | B25J 15/0023 |
| | | | | 294/86.4 |
| 2014/0292010 A1* | 10/2014 | Graupner | ................. | B25J 15/00 |
| | | | | 294/61 |
| 2015/0086791 A1* | 3/2015 | Browne | ................. | B25J 15/008 |
| | | | | 428/414 |

\* cited by examiner

APPARATUS FOR SUPPORTING WORKPIECE, METHOD OF SUPPORTING WORKPIECE, AND ROBOT ARM

CROSS REFERENCE TO RELATED APPLICATIONS

This application is based upon and claims the benefit of priority from Japanese patent application No. 2018-047832, filed on Mar. 15, 2018, the disclosure of which is incorporated herein in its entirety by reference.

BACKGROUND

The present disclosure relates to an apparatus for supporting a workpiece, a method of supporting a workpiece, and a robot arm.

Japanese Unexamined Patent Application Publication No. 2013-136125 discloses a gripping apparatus capable of absorbing a manufacturing error of a workpiece and gripping the workpiece. More specifically, the gripping apparatus disclosed in Japanese Unexamined Patent Application Publication No. 2013-136125 includes a swing member rotatable around the axis in the direction perpendicular to a direction that approaches or goes away from another gripping apparatus, and a gripping member provided in the swing member via a ball joint. According to this structure, the manufacturing error of the workpiece can be absorbed by the swing of the swing member and oscillation of the gripping member by the ball joint.

SUMMARY

The Applicant has found the following problem. While the gripping apparatus disclosed in Japanese Unexamined Patent Application Publication No. 2013-136125 is able to absorb the manufacturing error of the workpiece and grip the workpiece, it cannot grip workpieces having different shapes. That is, in order to grip a plurality of types of workpieces, it is required to prepare a gripping apparatus that corresponds to each of the shapes of the respective workpieces. The gripping apparatus disclosed in Japanese Unexamined Patent Application Publication No. 2013-136125 has a problem that it does not have such versatility.

The present disclosure has been made in view of the aforementioned problem and aims to provide an apparatus for supporting a workpiece, a method of supporting the workpiece, and a robot arm having high versatility that can address a plurality of types of workpieces.

An apparatus for supporting a workpiece according to one aspect of the present disclosure includes:

a resin part configured to support the workpiece, the resin part being softened when it is heated to a predetermined first temperature or higher in an initial shape, cured when it is cooled down to a temperature lower than a predetermined second temperature from the state in which it is softened, and softened while it is restored to the initial shape when it is heated again to the first temperature or higher;

a temperature adjustment part configured to adjust the temperature of the resin part; and a controller configured to control the temperature adjustment part.

Accordingly, every time the workpiece to be supported is changed, the resin part is heated to the first temperature or higher and is thus formed into the initial shape, and the workpiece is pressed against the resin part, which has the initial shape, whereby it is possible to form the resin part into a shape that corresponds to the shape of the workpiece. Therefore, even when the material handling that corresponds to the shapes of the respective workpieces is not prepared, a plurality of types of workpieces can be supported, and thus the apparatus for supporting the workpiece has high versatility.

The aforementioned apparatus for supporting the workpiece includes a data storage unit configured to store specific data indicating the type and the shape of the workpiece, in which the controller does not heat, when a workpiece to be supported this time is the same as a workpiece supported last time, the resin part by the temperature adjustment part, and heats, when the workpiece to be supported this time is different from the workpiece supported last time, the resin part to the first temperature or higher by controlling the temperature adjustment part and forms the resin part into the initial shape.

A robot arm according to one aspect of the present disclosure includes the aforementioned apparatus for supporting the workpiece.

A method of supporting a workpiece according to one aspect of the present disclosure includes:

determining whether a workpiece to be supported this time by a resin part is the same as a workpiece supported last time, the resin part being softened when it is heated to a predetermined first temperature or higher in an initial shape, cured when it is cooled down to a temperature lower than a predetermined second temperature from the state in which it is softened, and softened while it is restored to the initial shape when it is heated again to the first temperature or higher; and heating, when the workpiece to be supported this time is different from the workpiece supported last time, the resin part to the first temperature or higher to form the resin part into the initial shape, pressing the workpiece to be supported this time against the resin part to form a concave part in accordance with the shape of the workpiece to be supported this time, and supporting the workpiece to be supported this time by the resin part in a state in which the workpiece to be supported this time is fitted into the concave part of the resin part.

Accordingly, every time the workpiece to be supported is changed, the resin part is heated to the first temperature or higher and is thus formed into the initial shape, and the workpiece is pressed against the resin part, which has the initial shape, whereby it is possible to form the resin part into a shape that corresponds to the shape of the workpiece. Therefore, even when the material handling that corresponds to the shapes of the respective workpieces is not prepared, a plurality of types of workpieces can be supported, and thus the method of supporting the workpiece has high versatility.

The aforementioned method of supporting the workpiece includes a process of not heating, when the workpiece to be supported this time is the same as the workpiece supported last time, the resin part, and fitting the workpiece to be supported this time into a concave part of the resin part.

According to the present disclosure, it is possible to achieve the apparatus for supporting the workpiece, the method of supporting the workpiece, and the robot arm having high versatility that can address a plurality of types of workpieces.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, specific embodiments to which the present disclosure is applied will be explained in detail. However, the present disclosure is not limited to the following embodiments. Further, for the clarification of the description, the following descriptions and the drawings are simplified as appropriate.

First Embodiment

Figure 1:
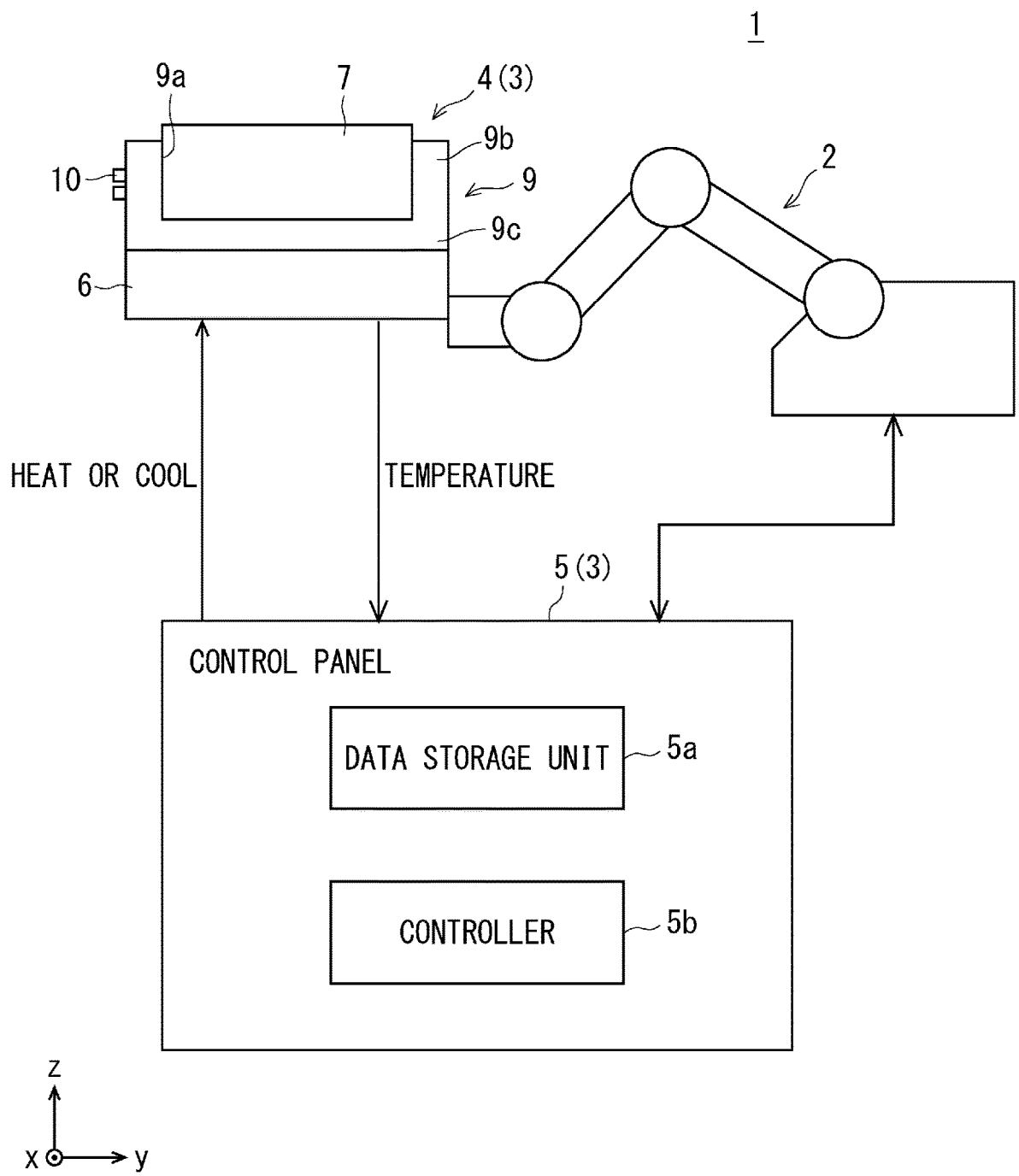
FIG. 1 is a view schematically showing a structure of a robot arm according to a first embodiment.

First, a structure of a robot arm according to this embodiment will be briefly explained. FIG. 1 is a view schematically showing the structure of the robot arm according to this embodiment. In the following description, for the sake of clarity of the description, descriptions will be given using a three-dimensional (XYZ) coordinate system.

A robot arm 1 is used, for example, when conveying a workpiece such as a body in a production line. However, the application of the robot arm 1 is not particularly limited. As shown in FIG. 1, the robot arm 1 includes a robot arm body 2 and a supporting apparatus 3. The robot arm body 2 is, for example, an articulated robot arm. The supporting apparatus 3 includes a material handling 4 and a control panel 5 in order to support a workpiece such as a body.

Figure 2:
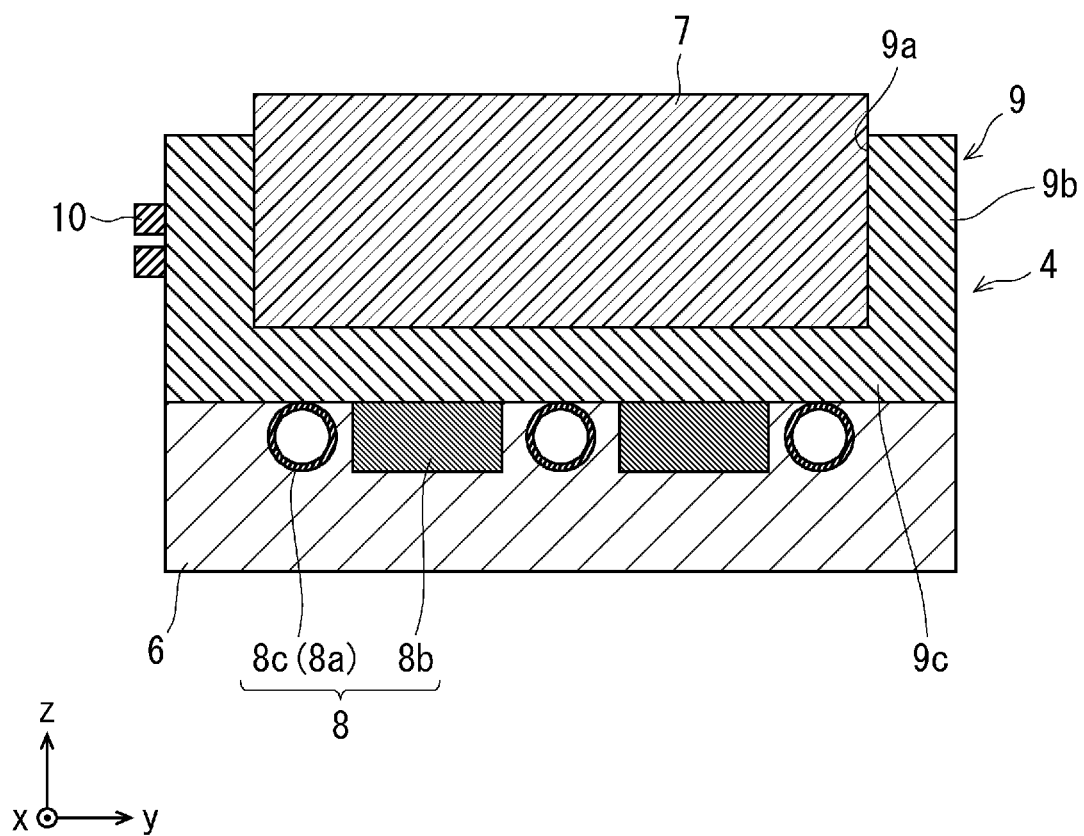
FIG. 2 is a cross-sectional view schematically showing a material handling of the robot arm according to the first embodiment.

FIG. 2 is a cross-sectional view schematically showing a material handling of the robot arm according to this embodiment. As shown in FIG. 1, the material handling 4 is connected to the distal end part of the robot arm body 2. The material handling 4 includes a base part 6, a resin part 7, a temperature adjustment part 8, a heat transfer unit 9, and a temperature detection part 10, as shown in FIG. 2.

The base part 6 is connected to the distal end part of the robot arm body 2. The base part 6 is made of, for example, iron. The resin part 7 supports the workpiece. The resin part 7 is, for example, a plate-shaped member in which a supporting surface of the workpiece is included on the Z-axis positive side surface of the resin part 7. A concave part that corresponds to the shape of the workpiece to be supported is formed in the resin part 7, the details of which will be explained later.

The Z-axis positive side surface of the resin part 7 may have a shape that is able to support a part of the end part of the workpiece on the Z-axis negative side or may have a shape that is able to support the whole end part of the workpiece on the Z-axis negative side. In short, it is sufficient that the resin part 7 have a shape capable of supporting the workpiece from the Z-axis negative side. The resin part 7 is placed on the Z-axis positive side surface of the base part 6.

The aforementioned resin part 7 is made of shape-memory resin such as polymer resin. Therefore, the resin part 7 is softened when it is heated to a predetermined first temperature or higher in the initial shape, is cured when it is cooled down to a temperature lower than a predetermined second temperature from the state in which it is softened, and is softened while it is restored to the initial shape when it is heated again to the first temperature or higher.

The temperature adjustment part 8 adjusts the temperature of the resin part 7. The temperature adjustment part 8 includes a cooler 8a and a heating device 8b. The cooler 8a cools the resin part 7. The cooler 8a includes, for example, a cooling path 8c and a pump (not shown) formed in the base part 6, and is configured in such a way that gas or fluid flows inside the cooling path 8c as a cooling medium. Accordingly, when the cooling medium is made to flow inside the cooling path 8c via the pump, the resin part 7 is cooled via the base part 6.

The heating device 8b heats the resin part 7. The heating device 8b includes, for example, a heater that is embedded inside the base part 6. Accordingly, when the heater is energized and heated, the resin part 7 is heated via the base part 6.

It is sufficient that the cooling path 8c of the cooler 8a and the heater of the heating device 8b be arranged in such a way that the whole resin part 7 can be cooled or heated when viewed from the Z-axis direction.

The heat transfer unit 9 surrounds the resin part 7 so that even the inside of the resin part 7 is cooled and heated. The heat transfer unit 9 is formed of, for example, copper, which is one of materials having thermal conductivities higher than that of the base part 6, and includes a fit part 9a, a side wall part 9b, and a bottom part 9c. The fit part 9a is formed inside the side wall part 9b and the resin part 7 is fitted into the fit part 9a. The Z-axis positive side surface of the resin part 7 fitted into the fit part 9a is exposed from the heat transfer unit 9.

The side wall part 9b covers the side surface of the resin part 7 in such a way that the surface of the side wall part 9b contacts the side surface of the resin part 7. The side wall part 9b may cover all the side surfaces of the resin part 7 or may cover a part of the side surfaces of the resin part 7. In short, it is sufficient that the side wall part 9b be arranged in such a way that even the inside of the resin part 7 is cooled and heated.

The bottom part 9c covers the z-axis negative side surface of the resin part 7 in such a way that the surface of the bottom part 9c contacts the z-axis negative side surface of the resin part 7. The bottom part 9c is continuous with the end part of the side wall part 9b on the Z-axis negative side. This heat transfer unit 9 is fixed on the Z-axis positive side surface of the base part 6. Accordingly, the resin part 7 is heated and cooled by the temperature adjustment part 8 via the heat transfer unit 9.

The temperature detection part 10 detects the temperature of the resin part 7 and outputs the result of the detection to the control panel 5. The temperature detection part 10, which is, for example, a probe-type thermometer, is fixed to the side wall part 9b of the heat transfer unit 9. Then the probe of the temperature detection part 10 is made to pass through a through-hole (not shown) formed in the side wall part 9b, and the distal end part of the probe contacts the resin part 7. However, the temperature detection part 10 is not limited to a probe-type thermometer and may be any thermometer having a structure capable of detecting the temperature of the resin part 7.

The control panel 5 includes a data storage unit 5a and a controller 5b. The data storage unit 5a stores specific data such as the type of the workpiece supported by the resin part 7, the shape of this workpiece, the convey destination and the like. The controller 5b, the details of which will be explained later, determines whether the workpiece to be supported by the resin part 7 this time is the same as the workpiece supported by the resin part 7 last time based on the specific data of the workpiece, and controls the pump of the cooler 8a of the temperature adjustment part 8 or the heating device 8b based on the result of the determination. The controller 5b further controls the robot arm body 2.

While the robot arm 1 according to this embodiment also uses the control panel 5 in order to control the temperature adjustment part 8 and the robot arm body 2, the robot arm 1 may additionally include a control panel for controlling the robot arm body 2.

Next, a procedure for conveying the workpiece using the robot arm 1 according to this embodiment will be explained. It is assumed that, in this embodiment, a vehicle body is conveyed as a workpiece, and the method of supporting the body (supporting process) is executed in the process of conveying the body using the robot arm 1. In the initial shape of the resin part 7, it is assumed that the Z-axis positive side surface of the resin part 7 is substantially flat. It is further assumed that the robot arm 1 supports the workpiece conveyed to a predetermined delivery part.

Figure 3:
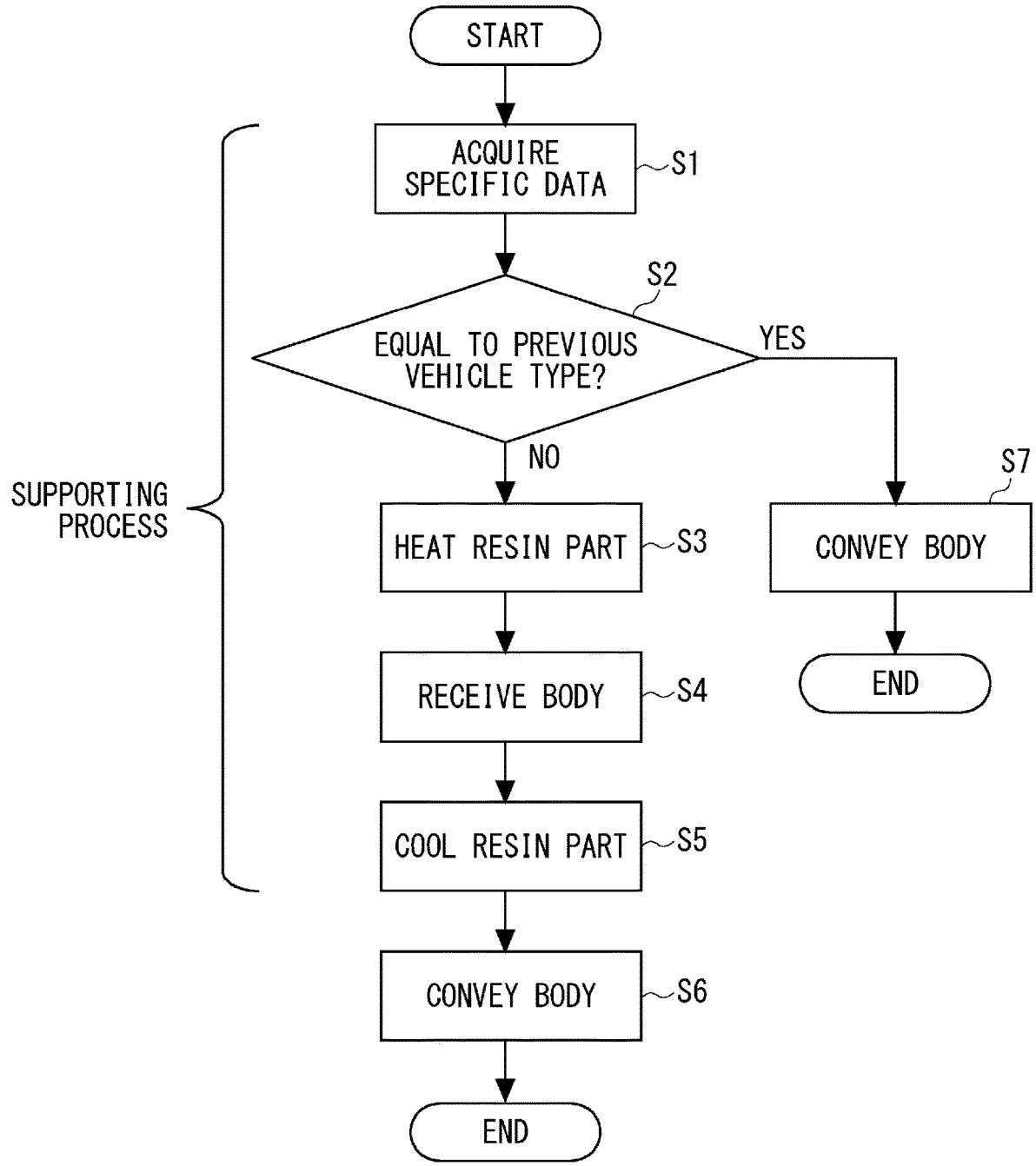
FIG. 3 is a flowchart showing a procedure for conveying a body using the robot arm according to the first embodiment.
Figure 4:
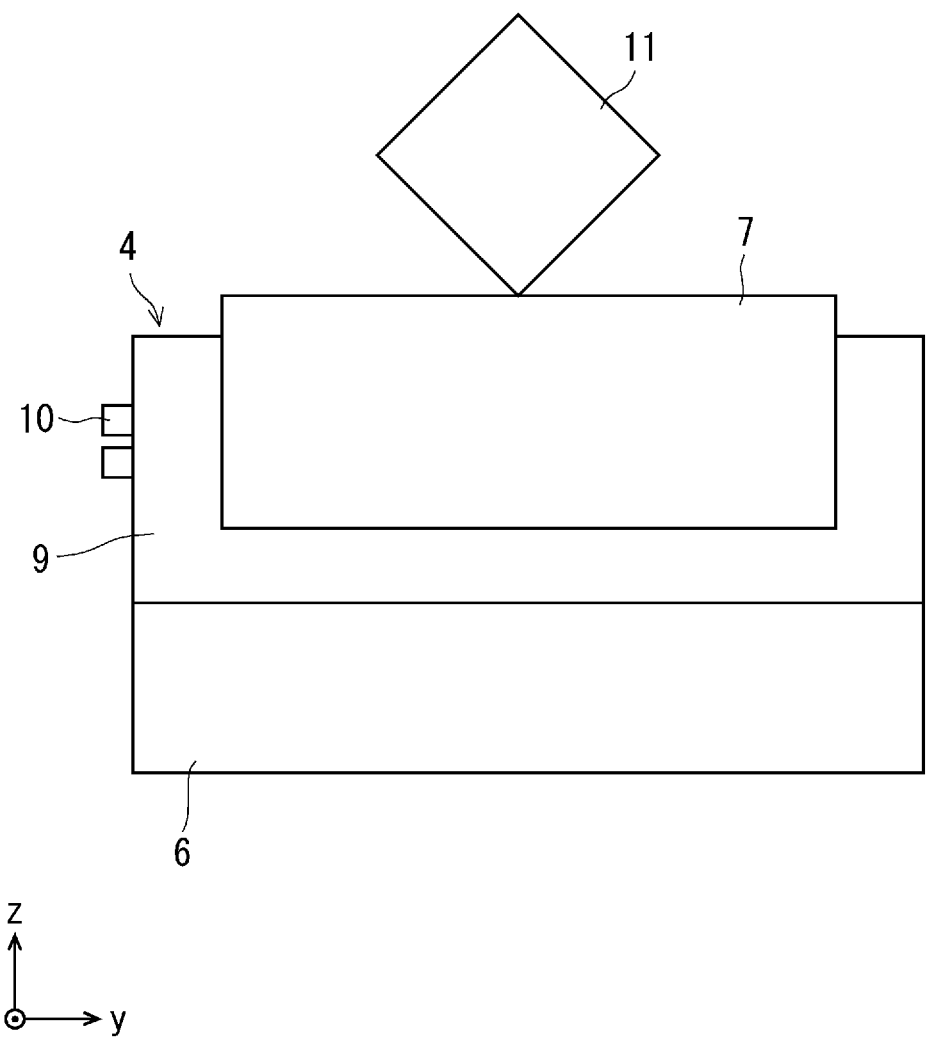
FIG. 4 is a side view schematically showing an initial shape of a resin part according to the first embodiment.
Figure 5:
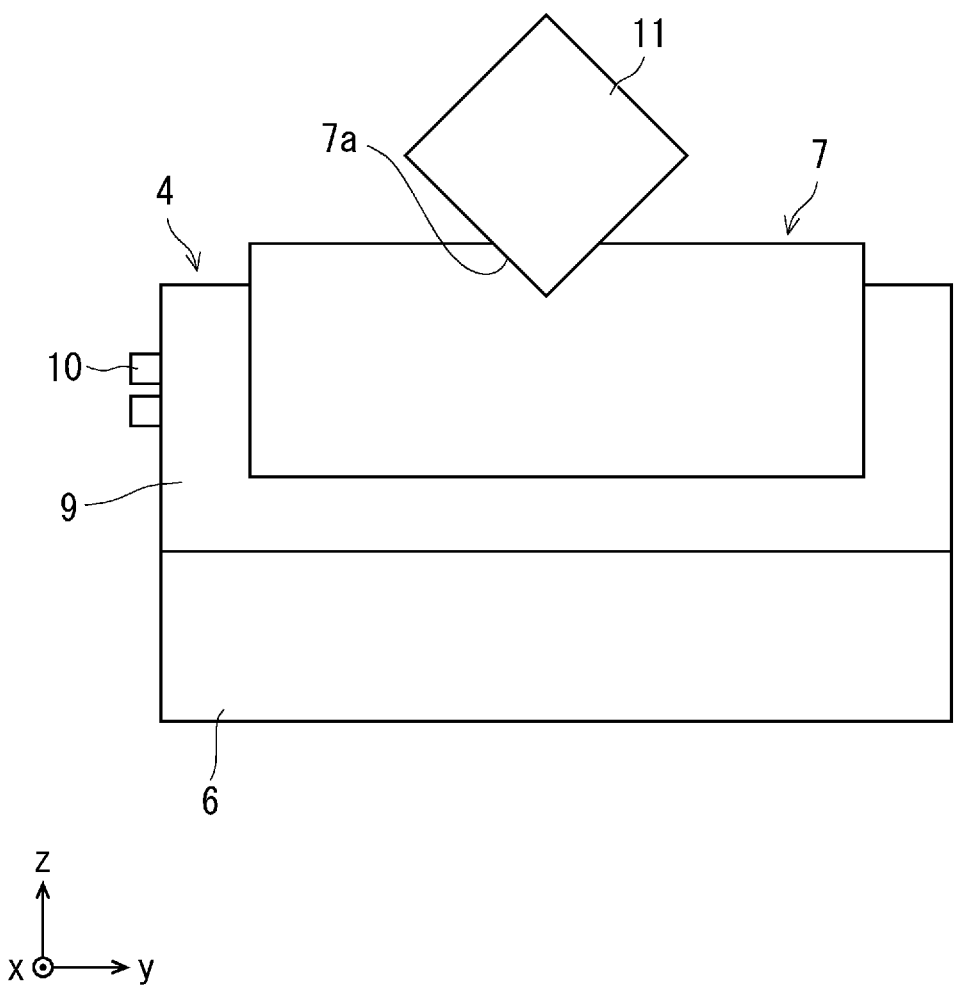
FIG. 5 is a side view schematically showing a state in which the shape of the body is transferred to the resin part according to the first embodiment.

FIG. 3 is a flowchart showing a procedure for conveying the body using the robot arm according to this embodiment. FIG. 4 is a side view schematically showing the initial shape of the resin part according to this embodiment. FIG. 5 is a side view schematically showing a state in which the shape of the body is transferred to the resin part according to this embodiment. In FIGS. 4 and 5, a part of the body is shown in a simplified manner, and the shape of the body is not accurately shown.

First, the controller 5b acquires the specific data of the body 11 to be supported by the resin part 7 this time from the data storage unit 5a (S1). More specifically, the specific data of the body 11 is, for example, data indicating the vehicle type, the shape of the body 11, the convey destination and the like, and is stored in the data storage unit 5a. Therefore, the controller 5b is able to acquire the specific data of the body 11 to be supported by the resin part 7 this time by reading the specific data of the body 11 from the data storage unit 5a.

Next, the controller 5b determines whether the body 11 to be supported by the resin part 7 this time is the same as the body 11 supported by the resin part 7 last time (S2). More specifically, the controller 5b acquires, for example, the specific data of the body 11 supported by the resin part 7 last time from the data storage unit 5a, and determines, based on the vehicle type indicated by the specific data of the body 11 to be supported by the resin part 7 this time and the vehicle type indicated by the specific data of the body 11 supported by the resin part 7 last time, whether the body 11 to be supported by the resin part 7 this time is the same as the body 11 supported by the resin part 7 last time.

Next, when the body 11 to be supported by the resin part 7 this time is different from the body 11 supported by the resin part 7 last time (NO in S2), the controller 5b controls the temperature adjustment part 8 and heats the resin part 7 (S3). More specifically, the controller 5b controls the heating device 8b of the temperature adjustment part 8 based on the result of the detection in the temperature detection part 10, thereby heating the resin part 7 to a first temperature (e.g., 45° C.) or higher via the base part 6 and the heat transfer unit 9.

At this time, while the concave part that corresponds to the shape of the end part of the body 11 on the Z-axis negative side supported last time is formed in the resin part 7, when the resin part 7 is heated to the first temperature or higher, as shown in FIG. 4, the resin part 7 is softened while it is restored to the initial shape in which the Z-axis positive side surface thereof is substantially flat.

Next, the controller 5b controls the robot arm body 2 in such a way that the robot arm body 2 receives the body 11 to be supported by the resin part 7 this time while controlling the heating device 8b of the temperature adjustment part 8 (S4). More specifically, the controller 5b controls the robot arm body 2 in such a way that the material handling 4 approaches the body 11 from the Z-axis negative side and causes the end part of the body 11 on the Z-axis negative side to contact the Z-axis positive side surface of the resin part 7, thereby pressing the body 11 into the resin part 7 by a predetermined depth.

In this case, the resin part 7 is softened since it is heated to the first temperature or higher, as described above, and the shape of the end part of the body 11 on the Z-axis negative side is transferred to the Z-axis positive side surface of the resin part 7, as shown in FIG. 5. That is, the concave part 7a in accordance with the shape of the end part of the body 11 to be supported this time on the Z-axis negative side is formed on the Z-axis positive side surface of the resin part 7. When the concave part 7a is formed on the Z-axis positive side surface of the resin part 7, the side wall part 9b is formed in such a way that the body 11 does not contact the side wall part 9b of the heat transfer unit 9.

The controller 5b outputs coordinate data of the respective joints of the robot arm body 2 when the shape of the end part of the body 11 on the Z-axis negative side is transferred to the Z-axis positive side surface of the resin part 7 and the like to the data storage unit 5a. The coordinate data of the respective joints of the robot arm body 2 can be obtained based on, for example, the result of the detection in an encoder provided in the motor of each joint. The data storage unit 5a stores, besides the specific data, the coordinate data of the respective joints of the robot arm body 2. The coordinate data may be deleted from the data storage unit 5a when, for example, the body 11 to be supported by the resin part 7 this time is different from the body 11 supported by the resin part 7 last time.

Next, the controller 5b controls the pump of the cooler 8a of the temperature adjustment part 8 in order to cool the resin part 7 (S5). More specifically, the controller 5b controls the pump of the cooler 8a of the temperature adjustment part 8 based on the result of the detection in the temperature detection part 10 while controlling the robot arm body 2 so as to keep the state in which the end part of the body 11 on the Z-axis negative side is pressed into the Z-axis positive side surface of the resin part 7 by a predetermined depth, and cools the resin part 7 to a temperature lower than a second temperature (e.g., 25° C.) via the base part 6 and the heat transfer unit 9. Accordingly, the resin part 7 is cured in a state in which the concave part 7a in accordance with the shape of the end part of the body 11 on the Z-axis negative side is formed on the Z-axis positive side surface of the resin part 7.

Next, the controller 5b controls the robot arm body 2 in order to convey the body 11 (S6). More specifically, since the body 11 has already been fitted into the concave part 7a and already been supported by the resin part 7 in the process of S5, the controller 5b controls the robot arm body 2 and conveys the body 11 to a predetermined convey destination. After that, when the controller 5b controls the robot arm body 2 so as to move the material handling 4 in the Z-axis negative side with respect to the body 11, the robot arm 1 is ready to support a new body 11.

On the other hand, when the body 11 to be supported by the resin part 7 this time is the same as the body 11 supported by the resin part 7 last time (YES in S2), the controller 5b supports and conveys the body 11 using the concave part 7a already formed in the resin part 7 (S7).

More specifically, the controller 5b acquires the coordinate data of the respective joints of the robot arm body 2 from the data storage unit 5a. The coordinate data of the respective joints of the robot arm body 2 is coordinate data of the respective joints of the robot arm body 2 when the shape of the body 11 to be supported is transferred to the resin part 7. Therefore, by controlling the robot arm body 2 based on the coordinate data acquired by the controller 5b, it is possible to properly fit the body 11 into the concave part 7a of the resin part 7 and support the body 11.

Then, in the state in which the body 11 is fitted into the concave part 7a of the resin part 7, the controller 5b controls the robot arm body 2 and conveys the body 11 to a predetermined convey destination.

As described above, in the apparatus 3 for supporting the workpiece, the method of supporting the workpiece, and the robot arm 1 according to this embodiment, the workpiece is supported by the resin part 7 that is softened when it is heated to the first temperature or higher in the initial shape, is cured when it is cooled down to a temperature lower than the second temperature from the state in which it is softened, and is softened while it is restored to the initial shape when it is heated again to the first temperature or higher.

Accordingly, every time the workpiece to be supported is changed, the resin part 7 is heated to the first temperature or higher and is thus formed into the initial shape, and the workpiece is pressed against the resin part 7, which has the initial shape, whereby it is possible to form the resin part 7 into a shape in accordance with the shape of the workpiece. Therefore, according to the apparatus 3 for supporting the workpiece, the method of supporting the workpiece, and the robot arm 1 according to this embodiment, it is possible to support a plurality of types of workpieces without replacing the material handling 4 by another one, and the aforementioned apparatus, method, and robot arm have high versatility.

In general, a receiving piece that receives a predetermined position of the body and a receiving pin inserted into a hole formed in the body are attached to a jig of the material handling, and the body is supported using the receiving piece or the receiving pin. Therefore, when the hole position or the hole shape of the body is changed in accordance with the change of the body to be supported, the receiving piece or the receiving pin needs to be replaced by another one each time. In this case, the receiving piece or the receiving pin needs to be attached to the jig of the material handling with a high precision. Therefore, there is a problem that the work of replacing the receiving piece or the receiving pin by a new one is complicated, the replacement time increases, and the efficiency of conveying the body is low.

Figure 6:
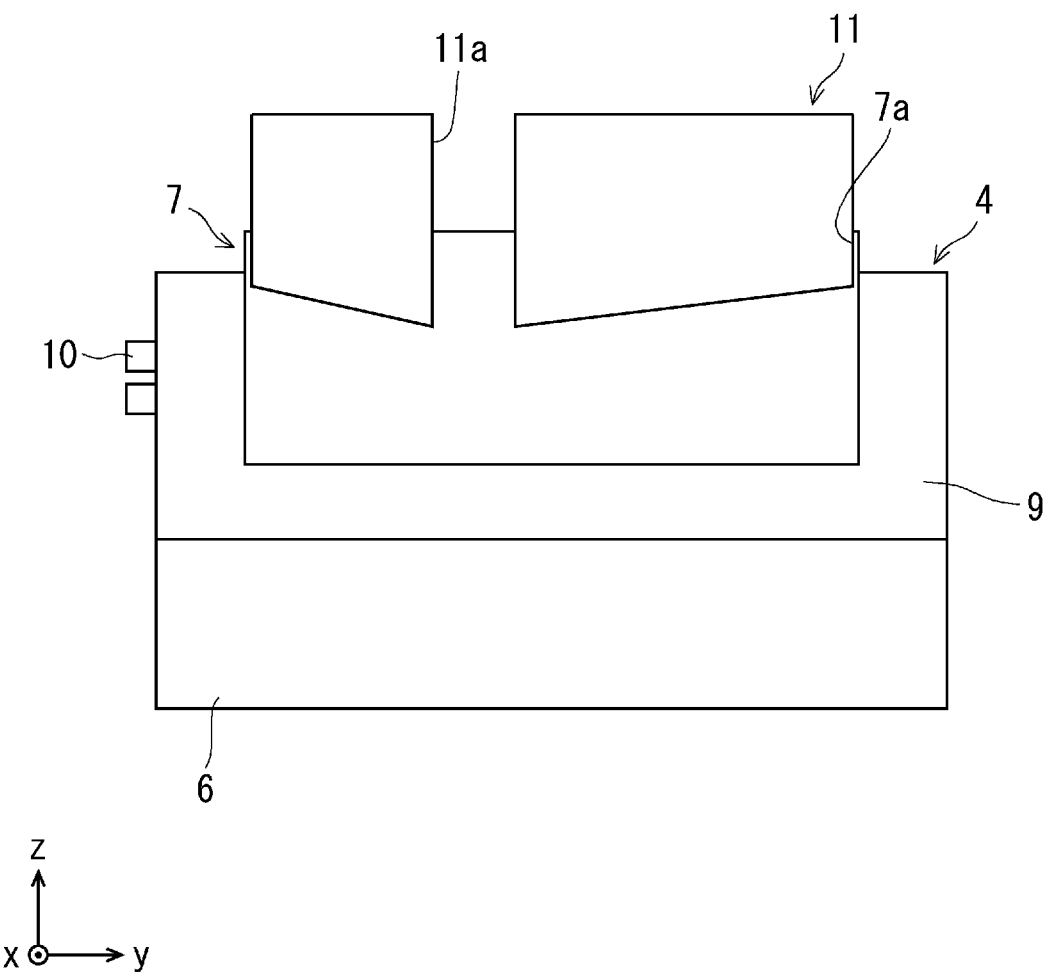
FIG. 6 is a side view schematically showing a state in which the body is supported by the resin part according to the first embodiment.
Figure 7:
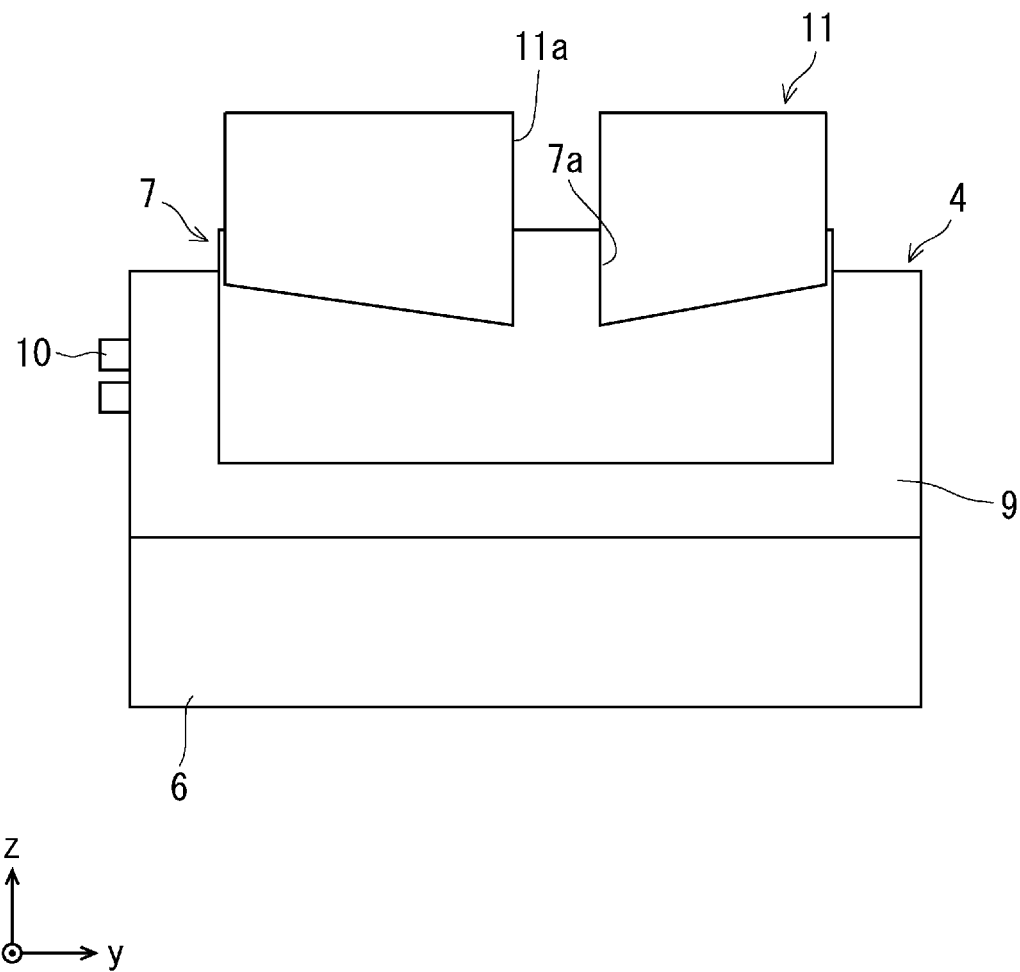
FIG. 7 is a side view schematically showing a state in which the body whose hole position is different from that in FIG. 6 is supported by the resin part according to the first embodiment.
Figure 8:
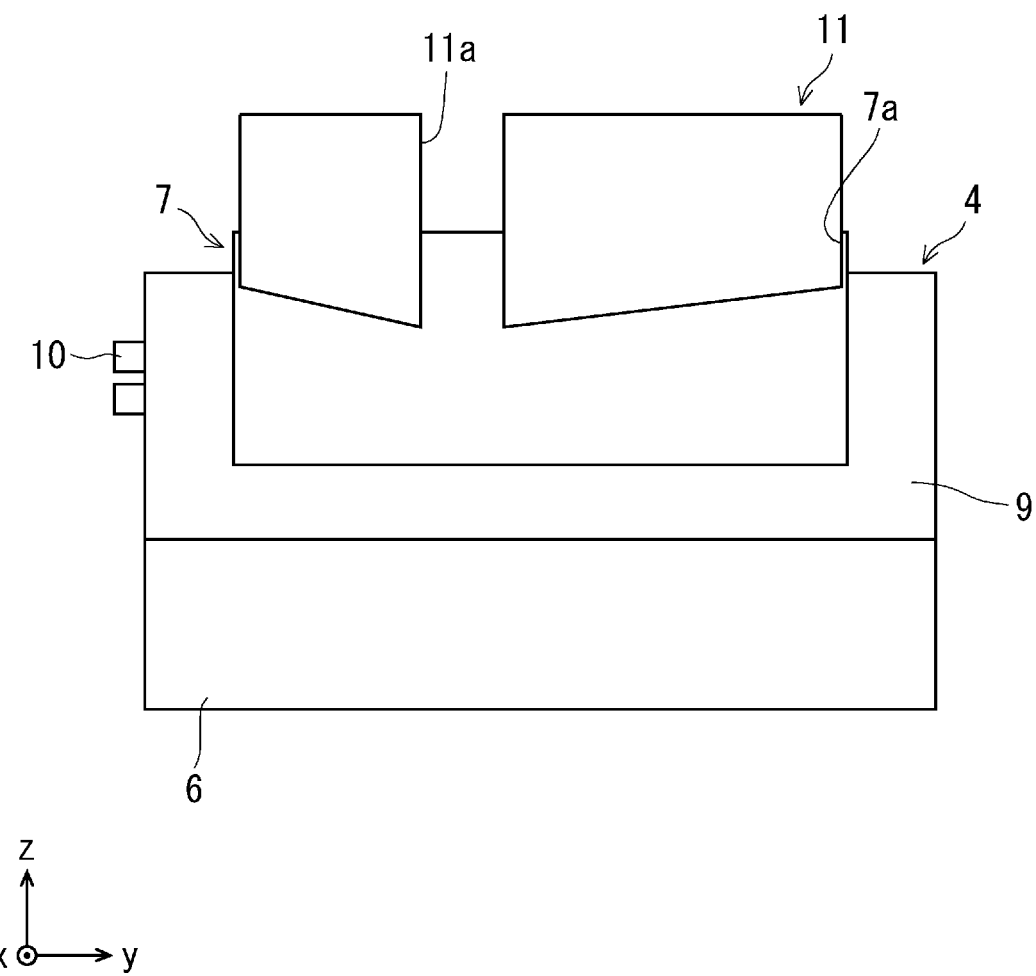
FIG. 8 is a side view schematically showing a state in which the body is supported by the resin part according to the first embodiment.
Figure 9:
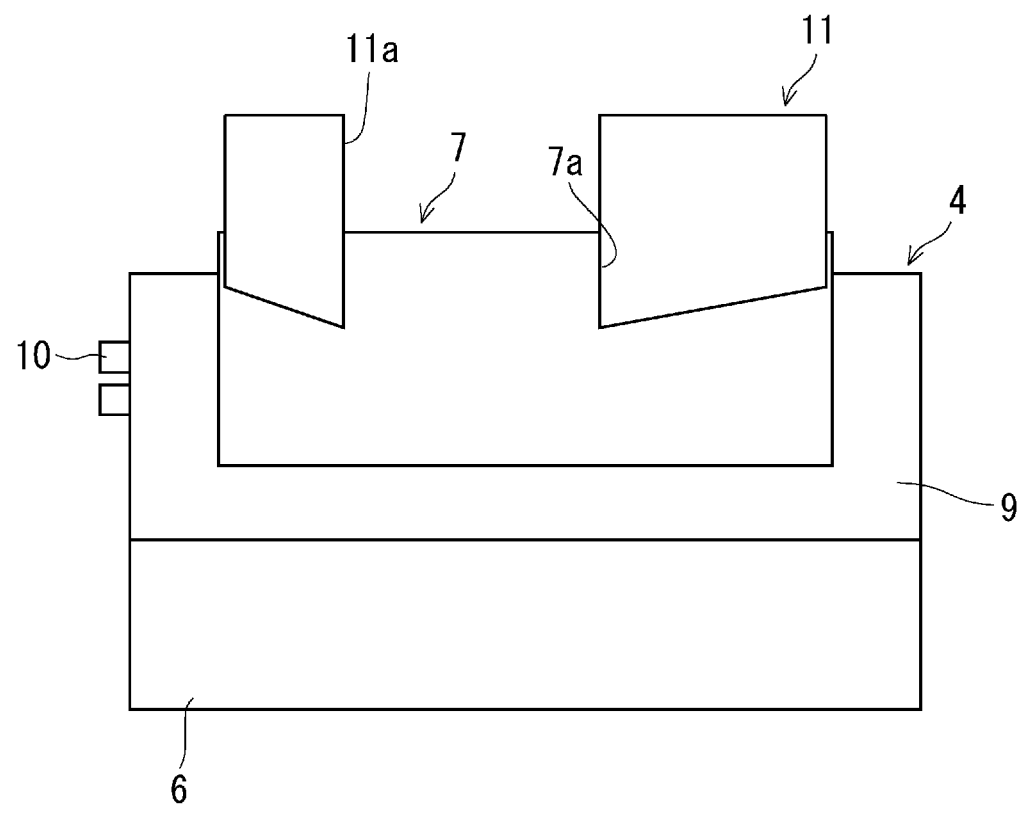
FIG. 9 is a side view schematically showing a state in which the body whose hole shape is different from that in FIG. 8 is supported by the resin part according to the first embodiment.

FIG. 6 a side view schematically showing a state in which the body is supported by the resin part according to this embodiment. FIG. 7 is a side view schematically showing a state in which the body whose hole position is different from that in FIG. 6 is supported by the resin part according to this embodiment. FIG. 8 is a side view schematically showing a state in which the body is supported by the resin part according to this embodiment. FIG. 9 is a side view schematically showing a state in which the body whose hole shape is different from that in FIG. 8 is supported by the resin part according to this embodiment. In FIGS. 6 to 9, a part of the body is shown in a simplified manner, and the shape of the body is not accurately shown.

As shown in FIGS. 6 and 7, in this embodiment, the shape of the resin part 7 can be changed as appropriate in accordance with the position of a hole 11a of the body 11 to be supported, thereby addressing the change in the body 11 to be supported. Further, as shown in FIGS. 8 and 9, in this embodiment, it is possible to change the shape of the resin part 7 as appropriate in accordance with the shape of the hole 11a of the body 11, thereby addressing the change in the body 11 to be supported.

Therefore, when the apparatus 3 for supporting the workpiece, the method of supporting the workpiece, and the robot arm 1 according to this embodiment are used in a production line in which a plurality of types of bodies 11 are mixed, it is possible to omit the work of replacing the receiving piece or the receiving pin by a new one compared to the typical method of supporting the body, thereby improving the efficiency of conveying the body 11.

Second Embodiment

In a robot arm according to this embodiment, as compared to the robot arm 1 according to the first embodiment, a structure of the material handling is modified. The robot arm according to this embodiment has a structure substantially the same as that of the robot arm 1 according to the first embodiment and only the structure of the material handling is different from that in the first embodiment. Therefore, in the following description, only the structure of the material handling will be explained in order to omit overlapping descriptions.

Figure 10:
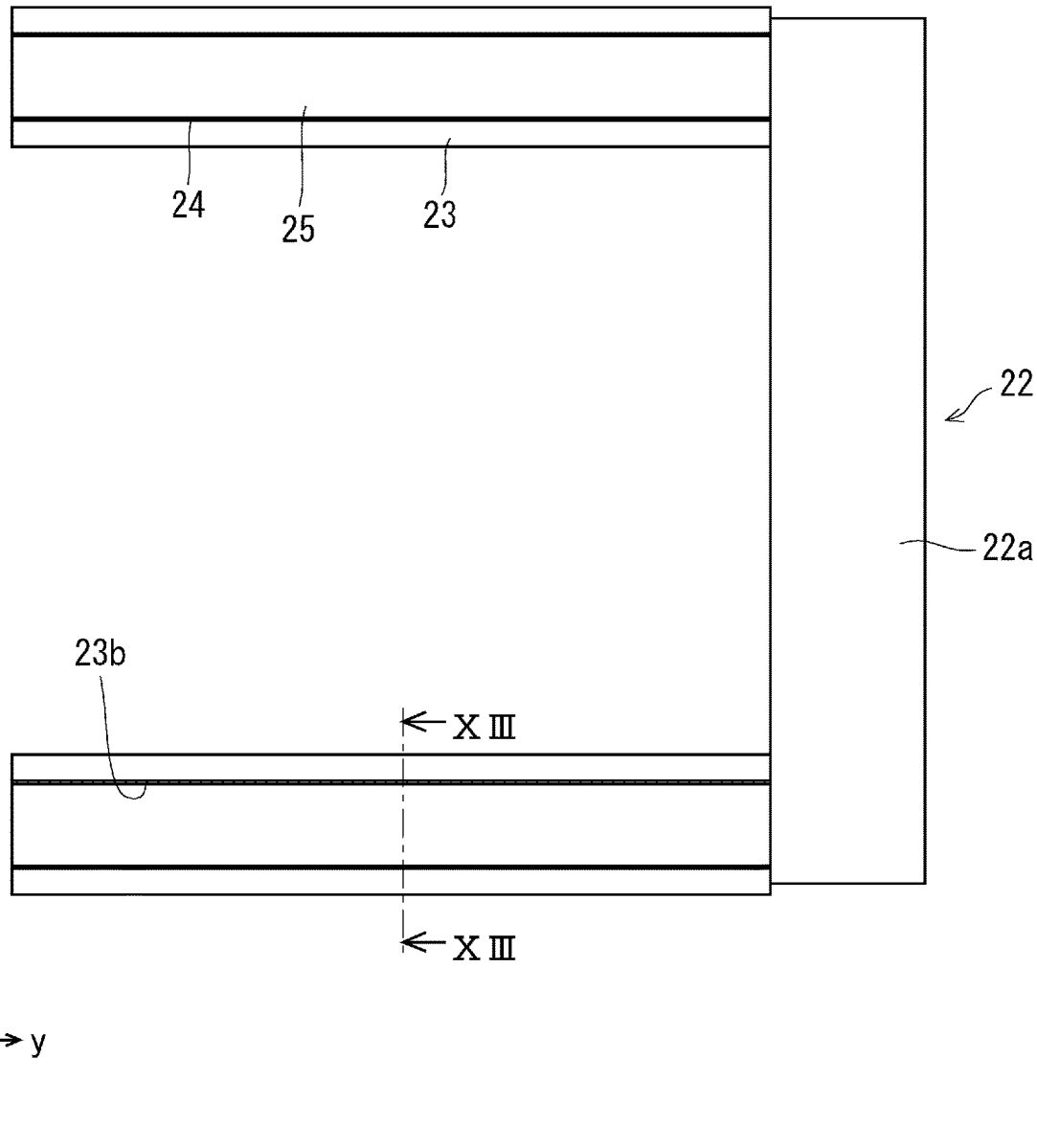
FIG. 10 is a plan view schematically showing a material handling according to a second embodiment.
Figure 11:
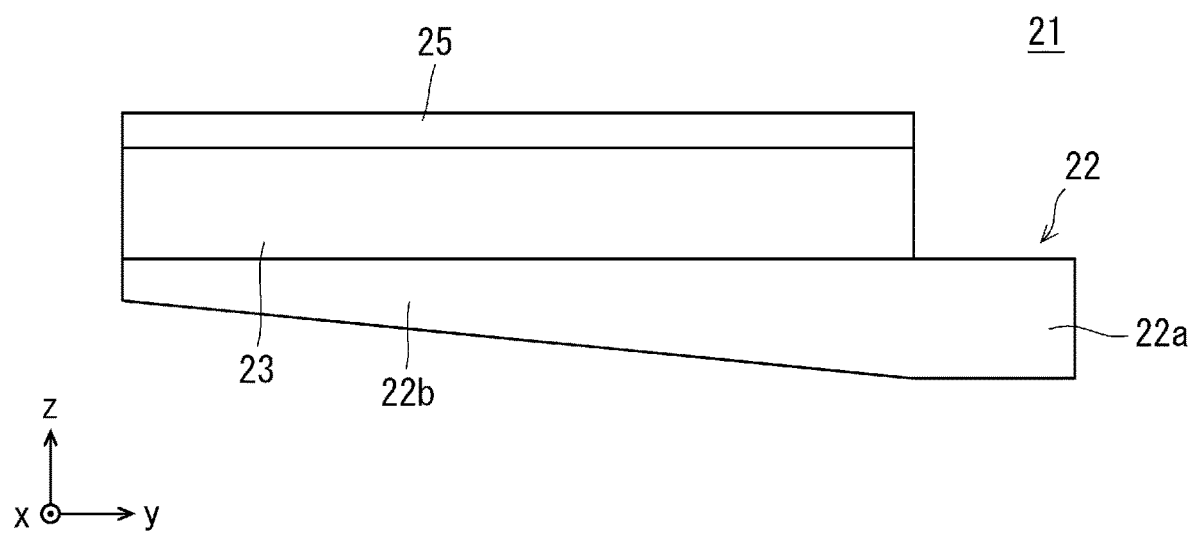
FIG. 11 is a side view schematically showing the material handling according to the second embodiment.
Figure 12:
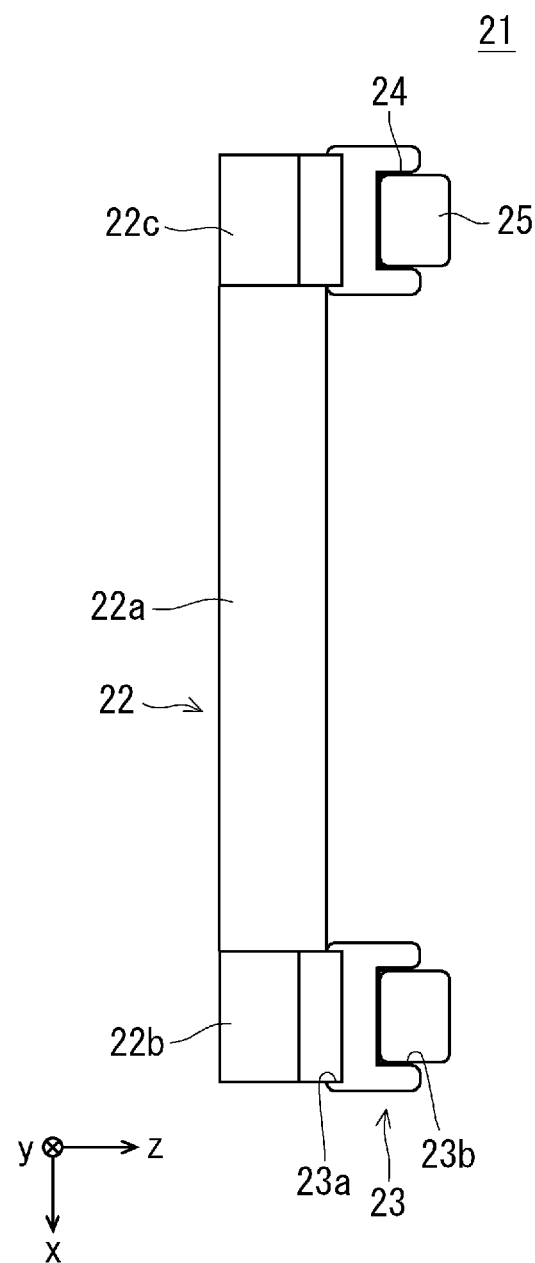
FIG. 12 is a front view schematically showing the material handling according to the second embodiment.
Figure 13:
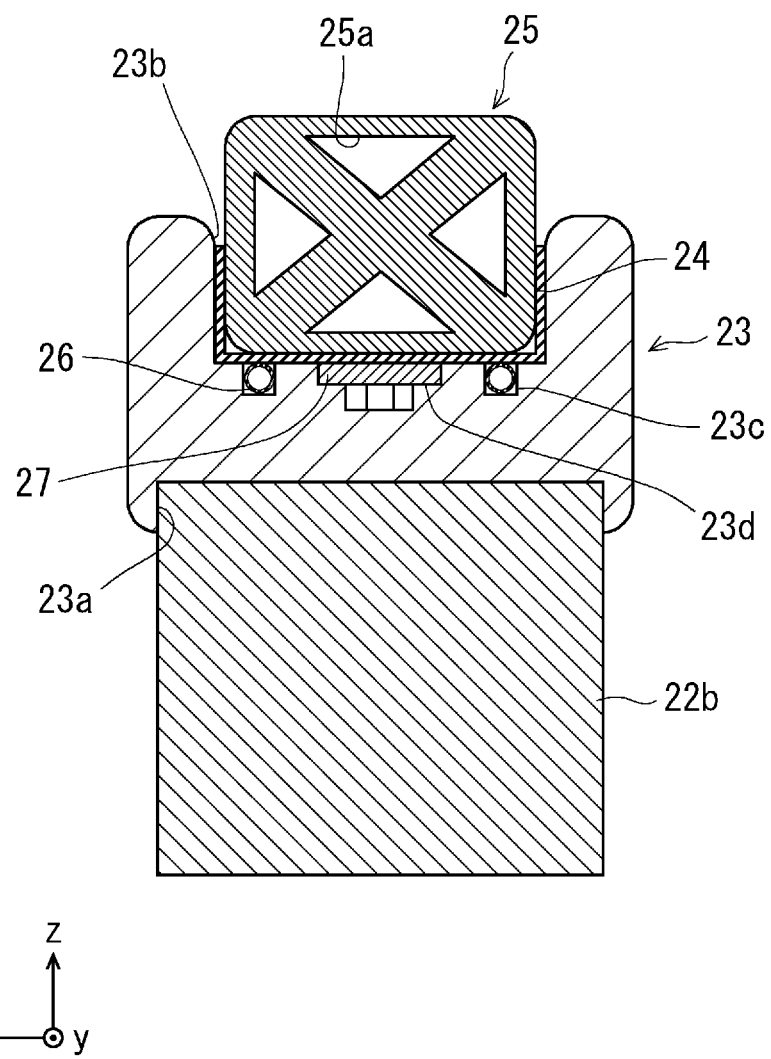
FIG. 13 is a cross-sectional view taken along the line XIII-XIII of FIG. 10.

FIG. 10 is a plan view schematically showing the material handling according to this embodiment. FIG. 11 is a side view schematically showing the material handling according to this embodiment. FIG. 12 is a front view schematically showing the material handling according to this embodiment. FIG. 13 is a cross-sectional view taken along the line XIII-XIII of FIG. 10. In FIGS. 10 to 13, the temperature adjustment part is omitted.

The material handling according to this embodiment is configured in such a way that even the inside of the resin part is easily heated and cooled. More specifically, a material handling 21 includes a base part 22, an adapter part 23, a heat transfer unit 24, and a resin part 25.

As shown in FIGS. 10 to 12, the base part 22 is formed to have a substantially gate shape when it is viewed from the Z-axis direction, and includes a basal part 22a extending in the X-axis direction, a first protrusion part 22b that is protruded from the end part of the basal part 22a on the X-axis positive side in the Y-axis negative direction, and a second protrusion part 22c that is protruded from the end part of the basal part 22a on the X-axis negative side in the Y-axis negative direction.

The lengths of the first protrusion part 22b and the second protrusion part 22c in the Y-axis direction are set to be longer than the width dimension of the workpiece in the Y-axis direction (e.g., the width dimension of the body). Further, the interval between the first protrusion part 22b and the second protrusion part 22c in the X-axis direction is set to be shorter than the length of the workpiece in the X-axis direction (e.g., the length of the body). This base part 22 is made of, for example, iron.

As shown in FIGS. 10 and 11, the adapter part 23 has a length that is substantially the same as the length of the first protrusion part 22b (the second protrusion part 22c) of the base part 22 in the Y-axis direction, and is made of, for example, aluminum. As shown in FIGS. 12 and 13, the adapter part 23 includes a first concave part 23a and a second concave part 23b.

As shown in FIG. 13, the first concave part 23a is formed on the z-axis negative side surface of the adapter part 23 and includes an opening part on the Z-axis negative side thereof. Then the first concave part 23a is extended in the Y-axis direction. This first concave part 23a is fitted into the end parts on the Z-axis positive side of the first protrusion part 22b and the second protrusion part 22c of the base part 22, whereby the adapter part 23 is fixed to the base part 22.

As shown in FIGS. 12 and 13, the second concave part 23b is formed on the Z-axis positive side surface of the adapter part 23, and includes an opening part on the Z-axis positive side thereof. Then the second concave part 23b is extended in the Y-axis direction. This second concave part 23b is set to be shallow with respect to the height of the resin part 25 in the Z-axis direction and has a shape that corresponds to the part of the resin part 25 on the Z-axis negative side. The XZ cross-sectional shape of the second concave part 23b is formed in a substantially rectangular shape.

As shown in FIG. 13, cooling pipes 26 and a heater 27 are provided in the aforementioned adapter part 23. A cooling medium is made to flow inside the cooling pipes 26, similar to the cooling path 8c according to the first embodiment. The cooling pipes 26 are arranged inside a groove 23c formed on the Z-axis negative side surface (bottom surface) of the second concave part 23b so as to extend in the Y-axis direction. Accordingly, the cooling pipes 26 are arranged in the vicinity of the bottom surface of the second concave part 23b. At this time, the cooling pipes 26 are spaced from each other along the X-axis direction. It is sufficient, however, that the cooling pipes 26 be arranged in the vicinity of the bottom surface of the second concave part 23b.

As shown in FIG. 13, the heater 27 is arranged inside a groove 23d formed on the bottom surface of the second concave part 23b so as to extend in the Y-axis direction. Therefore, the heater 27 is also arranged in the vicinity of the bottom surface of the second concave part 23b. At this time, for example, a heater body is arranged in the upper stage of the groove 23d and a wire is arranged in the lower stage of the groove 23d. Further, the heater 27 is arranged, for example, between the cooling pipes 26. It is sufficient that the heater 27 be arranged in the vicinity of the bottom surface of the second concave part 23b.

As shown in FIG. 13, the heat transfer unit 24 is fitted into the second concave part 23b in such a way that it extends along the peripheral surface of the second concave part 23b of the adapter part 23. The heat transfer unit 24 is formed of a material having a thermal conductivity higher than those of the base part 22 and the adapter part 23, and is bent in such a way that it extends along the peripheral surface of the second concave part 23b of the adapter part 23. For example, the heat transfer unit 24 is a plate-shaped member made of copper bent in a groove shape. As shown in FIG. 10, the heat transfer unit 24 has a length that is substantially equal to the length of the second concave part 23b of the adapter part 23 in the Y-axis direction. Accordingly, the heat transfer unit 24 covers the whole peripheral surface of the second concave part 23b of the adapter part 23.

The resin part 25 is made of shape-memory resin such as polymer resin, similar to the resin part 7 according to the first embodiment. As shown in FIGS. 10 and 11, the resin part 25 is formed in a long block shape, and has a length that is substantially equal to the length of the second concave part 23b of the adapter part 23 in the Y-axis direction. For example, the resin part 25 is formed in a substantially rectangular block shape. This resin part 25 is fitted into the heat transfer unit 24, as shown in FIGS. 12 and 13. Accordingly, the resin part 25 is fixed to the adapter part 23 via the heat transfer unit 24.

According to the aforementioned structure, when a cooling medium is made to flow inside the cooling pipes 26, it is possible to cool the resin part 25 via the heat transfer unit 24. Further, when the heater 27 is energized and heated, it is possible to heat the resin part 25 via the heat transfer unit 24. Therefore, according to the apparatus for supporting the workpiece, the method of supporting the workpiece, and the robot arm according to this embodiment as well, it is possible to support a plurality of types of workpieces without replacing the material handling 21 by another one, and the aforementioned apparatus, method, and robot arm have high versatility.

Moreover, since the length of the resin part 25 in the Y-axis direction is larger than the width dimension of the workpiece in the Y-axis direction, when the shape of the end part of the workpiece on the Z-axis negative side is transferred to the resin part 25 by pressing the workpiece against the resin part 25, it becomes possible to easily control the robot arm body 2.

Further, compared to a case in which the resin part is arranged so as to straddle the first protrusion part 22b and the second protrusion part 22c of the base part 22 when it is viewed from the Z-axis direction, the resin part 25 in the X-axis direction becomes thin, and thus even the inside of the resin part 25 can be easily heated and cooled. Therefore, it is possible to transfer the shape of the workpiece to the resin part 25 with a high precision.

The thickness of the resin part 25 in the X-axis direction is set in such a way that even the inside of the resin part 25 is heated substantially evenly by heating by the heat transfer unit 24 from the X-axis positive side surface of the resin part 25 and heating by the heat transfer unit 24 from the X-axis negative side surface of the resin part 25. Accordingly, it is possible to transfer the shape of the workpiece to the resin part 25 more accurately.

Further, a lightening part 25a is formed in the resin part 25 in order to reduce the weight of the resin part 25, as shown in FIG. 13. Accordingly, it is possible to reduce the weight of the material handling 21 and to reduce the size of the robot arm body 2 to which the material handling 21 is connected.

While the resin part 25 according to this embodiment is continuously formed in the Y-axis direction inside the second concave part 23b of the adapter part 23, it may be divided into a plurality of parts.

The present disclosure is not limited to the aforementioned embodiments and may be changed as appropriate without departing from the spirit of the present disclosure.

While the body is supported as a workpiece in the aforementioned embodiments, the member to be supported is not particularly limited.

While the resin part is heated and cooled via the heat transfer unit in the aforementioned embodiments, the heat transfer unit may be omitted.

While the apparatus for supporting the workpiece is used for the robot arm in the aforementioned embodiments, it can be used for a cart for conveying a workpiece, a conveying hanger or the like.

While the present disclosure has been described as a hardware configuration in the aforementioned embodiments, the present disclosure is not limited thereto. The present disclosure can achieve arbitrary processing by causing a Central Processing Unit (CPU) to execute a computer program.

A program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An apparatus for supporting a workpiece, comprising:
   a resin part configured to support the workpiece from below, the resin part being softened when it is heated to a predetermined first temperature or higher in an initial shape, cured when it is cooled down to a temperature lower than a predetermined second temperature from a state in which it is softened, and softened while it is restored to the initial shape when it is heated again to the first temperature or higher;
   a heat transfer unit including a side wall part and a bottom part, the resin part being fitted into a fitting part formed of the side wall part and the bottom part;
   a temperature adjustment part configured to adjust the temperature of the resin part via the heat transfer unit; and
   a controller configured to control the temperature adjustment part.

2. The apparatus for supporting the workpiece according to claim 1, comprising:
   a data storage unit configured to store specific data indicating a type and a shape of the workpiece,
   wherein the controller does not heat, when a workpiece to be supported this time is the same as a workpiece supported last time, the resin part by the temperature adjustment part, and heats, when the workpiece to be supported this time is different from the workpiece supported last time, the resin part to the first temperature or higher by controlling the temperature adjustment part and forms the resin part into the initial shape.

3. A robot arm comprising the apparatus for supporting the workpiece according to claim 1.

* * * * *